United States Patent
Jiang et al.

(10) Patent No.: US 10,571,669 B2
(45) Date of Patent: Feb. 25, 2020

(54) OPTICAL LENS

(71) Applicant: Young Optics Inc., Hsinchu (TW)

(72) Inventors: Sheng-Da Jiang, Hsinchu (TW);
Hsin-Te Chen, Hsinchu (TW);
Sheng-Tang Lai, Hsinchu (TW);
Kai-Yun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 331 days.

(21) Appl. No.: 14/979,515

(22) Filed: Dec. 28, 2015

(65) Prior Publication Data
US 2017/0184823 A1 Jun. 29, 2017

(51) Int. Cl.
G02B 13/16 (2006.01)
G02B 13/18 (2006.01)
G02B 9/10 (2006.01)

(52) U.S. Cl.
CPC ............. *G02B 13/16* (2013.01); *G02B 9/10* (2013.01); *G02B 13/18* (2013.01)

(58) Field of Classification Search
CPC ........ G02B 13/04; G02B 13/16; G02B 13/06; G02B 9/64; G02B 9/04
USPC .................................... 359/649–651
See application file for complete search history.

(56) References Cited

U.S. PATENT DOCUMENTS

| | | | |
|---|---|---|---|
| 6,542,316 B2 | 4/2003 | Yoneyama | |
| 6,560,041 B2 * | 5/2003 | Ikeda | G02B 13/02 359/649 |
| 6,621,645 B2 | 9/2003 | Sato | |
| 6,822,804 B2 * | 11/2004 | Maruyama | G02B 13/02 359/649 |
| 6,999,247 B2 | 2/2006 | Kim | |
| 7,123,426 B2 | 10/2006 | Lu et al. | |
| 7,126,767 B2 | 10/2006 | Lu | |
| 7,173,777 B1 | 2/2007 | Lu et al. | |
| 7,184,219 B2 | 2/2007 | Kobayashi | |
| 7,423,819 B1 | 9/2008 | Chuang et al. | |
| 7,426,079 B2 * | 9/2008 | Yokoyama | G02B 13/0095 359/642 |
| 7,800,828 B2 | 9/2010 | Lin | |
| 7,859,770 B2 | 12/2010 | Su et al. | |
| 7,944,623 B2 * | 5/2011 | Wang | G02B 13/18 359/716 |
| 7,952,817 B2 | 5/2011 | Kang et al. | |
| 8,139,293 B2 | 3/2012 | Zhao et al. | |
| 8,437,093 B2 | 5/2013 | Matsuo | |

(Continued)

FOREIGN PATENT DOCUMENTS

TW I247915 1/2006

OTHER PUBLICATIONS

Geary, Joseph M. Introduction to Lens Design with Practical ZEMAX Examples. Willmann-Bell, 2007.*

(Continued)

*Primary Examiner* — Zachary W Wilkes
(74) *Attorney, Agent, or Firm* — JCIPRNET

(57) ABSTRACT

An optical lens includes a first lens group and a second lens group. The first lens group is disposed between a magnified side and a minified side and has a negative refractive power. The second lens group is disposed between the first lens group and the minified side and has a positive refractive power. The optical lens is capable of forming an image at the magnified side. $0.52 > F/H > 0.46$, where F is an effective focal length, and H is an image height.

18 Claims, 6 Drawing Sheets

(56) References Cited

U.S. PATENT DOCUMENTS

| | | | |
|---|---|---|---|
| 8,451,548 B2 | 5/2013 | Liu et al. | |
| 8,830,298 B2 * | 9/2014 | Abe | G02B 13/0045 |
| | | | 348/36 |
| 2011/0292515 A1 * | 12/2011 | Kang | G02B 5/10 |
| | | | 359/649 |
| 2017/0108679 A1 * | 4/2017 | Eguchi | G02B 15/177 |

OTHER PUBLICATIONS

"Geometrical Optics." Introduction to Optics, by Frank L. Pedrotti et al., Pearson Prentice-Hall, 2007, pp. 16-49.*
Song, Seok. "Chapter 1. Ray Optics." 2018.*

* cited by examiner

OPTICAL LENS

BACKGROUND OF THE INVENTION

Field of Invention

The invention relates to an optical lens.

Background of the Invention

In general, a long projection distance is required if a projector needs to project an image onto a large screen. Contrarily, a special wide-angle lens is required to shorten the distance from the screen to the projector if the image is to be projected onto the large screen from a short projection distance. That is, the wide-angle lens may effectively reduce the distance from the screen to the projector and project a relatively large image. However, the aberration issue derived from the wide-angle lens is one of the obstacles faced by designers.

In view of the above, how to design a lens with low manufacturing costs and favorable imaging quality has become one of the research topics to people having ordinary skill in the pertinent field.

SUMMARY OF THE INVENTION

The invention is directed an optical lens having low costs and favorable optical characteristics.

Other aspects and advantages of the invention are set forth in the description of the techniques disclosed in the invention.

To achieve one of, a part of or all of the above-mentioned advantages, or to achieve other advantages, an embodiment of the invention provides an optical lens that includes a first lens group and a second lens group. The first lens group is disposed between a magnified side and a minified side and has a negative refractive power. The second lens group is disposed between the first lens group and the minified side and has a positive refractive power. The optical lens is capable of forming an image at the magnified side. 0.52>F/H>0.46, where F is an effective focal length of the optical lens, and H is an image height.

The embodiment of the invention has at least one of the following advantages or functions. The optical lens described in the embodiment of the invention includes two lens groups, which may effectively resolve the aberration issue, reduce the volume of the projection system, simplify the fabrication and assembly of the lens, and significantly lower down the overall costs on optical devices and the costs on the lens mechanism.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EXEMPLARY EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Accordingly, the drawings and descriptions will be regarded as illustrative in nature and not as restrictive.

Figure 1:
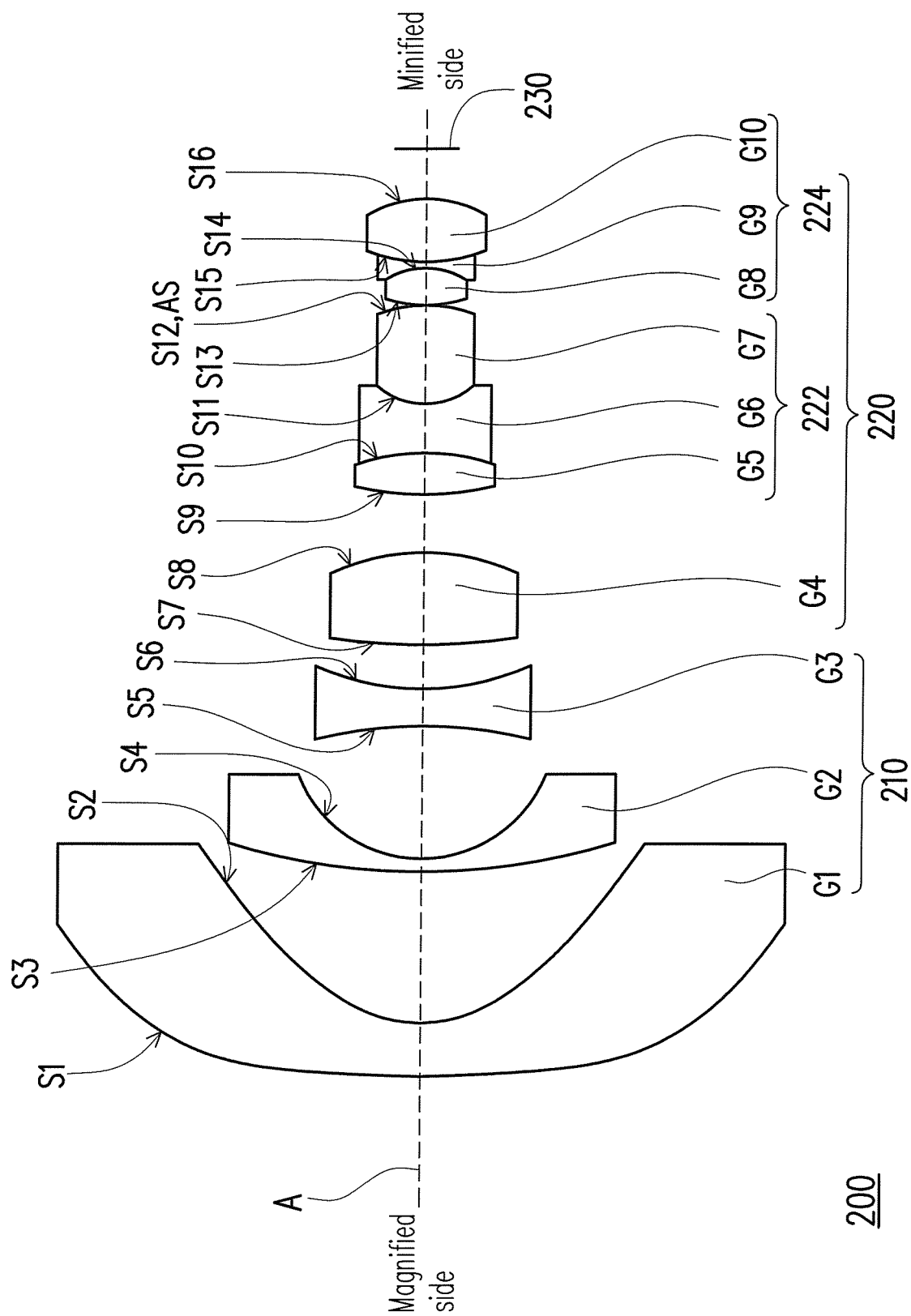
FIG. 1 is a schematic view of an optical lens according to one embodiment of the invention.
Figure 6:
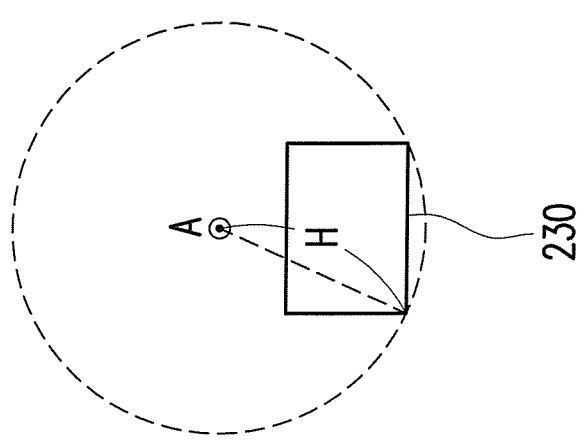
FIG. 6 is a schematic view briefly illustrating an image processing device disposed on a minified side according to an embodiment of the invention.

FIG. 1 is a schematic view of illustrating a structure of a fixed focal focal length lens according to one embodiment of the invention. Referring to FIG. 1, the optical lens 200 has an optical axis A in this embodiment and includes a first lens group 210 and a second lens group 220. The first lens group 210 is disposed between a magnified side and a minified side and has a negative refractive power. The second lens group 220 is disposed between the first lens group 210 and the minified side and has a positive refractive power. The optical lens 200 is capable of forming an image at the magnified side. F/H>0.46, where F is an effective focal length of the optical lens 200. In this embodiment, 0.52>F/H>0.46. FIG. 6 is a schematic view briefly illustrating an image processing device disposed on a minified side. The viewing angle is defined by watching from the magnified side to the minified side of the fixed focal length lens 200. The imaging process device 230 described in the embodiment is a light value, and the light value may be a DMD, for instance. The distance between the optical axis A of the fixed focal length lens 200 and the lower-left end point of the image processing device 230 may be defined as an image height H described herein. A circumscribed circle with the optical axis A as the circle center and the image height H as the radius may be made, and the circumscribed circle passes through the two lower end points of the image processing device 230.

In this embodiment, the first lens group 210 includes two aspheric lens and at least one lens having a refractive index greater than 1.75. In this embodiment, the f-number of the optical lens 200 may be substantially 2.4. In this embodiment, the second lens group 220 includes an aspheric lens. In addition, in this embodiment, the second lens group 220 includes at least one cemented lens.

Specifically, in this embodiment, the first lens group 210 includes a first lens G1, a second lens G2, and a third lens G3 arranged in sequence from the magnified side towards the minified side. The first lens G1 may be an aspheric lens. One of the second lens G2 and the third lens G3 is an aspheric lens. In this embodiment, the third lens G3 is an aspheric lens, and the second lens G2 is a spherical lens. In this embodiment, refractive powers of the first to third lenses G1, G2, and G3 are all negative. In this embodiment, the first lens G1 is a plastic lens, the second lens G2 is a glass lens, and the third lens G3 is a plastic lens.

In this embodiment, the first lens G1 is a convex-concave lens having a convex surface facing the magnified side, the second lens G2 is a convex-concave lens having a convex surface facing the magnified side, and the third lens G3 is a convex-concave lens having a convex surface facing the minified side.

In this embodiment, the second lens group 220 includes a fourth lens G4, a fifth lens G5, a sixth lens G6, a seventh lens G7, an eighth lens G8, a ninth lens G9, and a tenth lens G10 arranged in sequence from the magnified side towards the minified side, and refractive powers of the fourth to tenth lens G4, G5, G6, G7, G8, G9, and G10 are positive, positive, negative, positive, positive, negative, and positive, respectively. In this embodiment, the fifth, sixth, and seventh lenses G5, G6, and G7 form a triple cemented lens 222, e.g. a triple cemented glass lens. In addition, the eighth, ninth, and tenth lenses G8, G9, and G10 form a triple cemented lens 224, e.g. a triple cemented glass lens. In this embodiment, the tenth lens G10 is an aspheric lens. Besides, in this embodiment, an aperture stop AS is located at a surface S12 of the seventh lens G7 facing the minified side.

In this embodiment, the fourth lens G4 is a biconvex lens, the fifth lens G5 is a biconvex lens, the sixth lens G6 is a biconcave lens, the seventh lens G7 is a biconvex lens, the eighth lens G8 is a biconvex lens, the ninth lens G9 is a biconcave lens, and the tenth lens G10 is a biconvex lens.

In the optical lens 200 according to this embodiment, two lens group and three aspheric lenses are adopted, which may achieve a short focal length, a wide viewing angle, high resolution, and low aberration. Moreover, in this embodiment, the f-number of the optical lens 200 may achieve 2.4.

In an embodiment, the f-number of the optical lens 200 may range from 2.35 to 3.0 and is, for example 2.47; the effective focal length of the optical lens 200 may range from 5.0 mm to 7.8 mm and is, for example 5.42; the throw ratio (TR) of the optical lens 200 may range from 0.45 to 0.71 and is, for example 0.49.

An embodiment of the optical lens 200 is given hereinafter. However, the invention is not limited to the data listed in Tables 1 and 2.

TABLE 1

(F/H: 0.5)

| Surface | Curvature Radius(mm) | Interval (mm) | Refractive index | Abbe Number | Notes (refractive power) |
|---|---|---|---|---|---|
| S1 | 131.53 | 5.83 | 1.49 | 57.44 | First lens(−) |
| S2 | 14.34 | 16.94 | | | |
| S3 | 69.84 | 1.70 | 1.83 | 37.16 | Second lens(−) |
| S4 | 17.48 | 15.52 | | | |
| S5 | −33.58 | 3.27 | 1.53 | 56.28 | Third lens(−) |
| S6 | −85.60 | 5.42 | | | |
| S7 | 185.42 | 10.50 | 1.81 | 25.43 | Fourth lens(+) |
| S8 | −40.96 | 6.17 | | | |
| S9 | 37.26 | 4.62 | 1.65 | 33.79 | Fifth lens(+) |
| S10 | −18.48 | 5.50 | 1.77 | 49.60 | Sixth lens(−) |
| S11 | 10.11 | 11.00 | 1.60 | 39.24 | Seventh lens(+) |
| S12 | −19.66 | 0.15 | | | |
| S13 | 22.99 | 3.79 | 1.50 | 81.55 | Eighth lens(+) |
| S14 | −12.59 | 0.85 | 1.85 | 30.06 | Ninth lens(−) |
| S15 | 13.68 | 7.34 | 1.58 | 59.20 | Tenth lens(+) |
| S16 | −12.22 | 21.50 | | | |

In Table 1, the surface S12 is also an aperture stop AS, and the interval in the row of the surface S16 means the distance between the surface S16 and an image processing device 230.

The surfaces S1, S2, S5, S6, and S16 of the optical lens 200 are aspheric surfaces and may be represented by the following formula (1):

$$Z = \frac{cy^2}{1 + \sqrt{1 - (1+K)c^2 y^2}} + A_1 y^1 + A_2 y^2 + A_3 y^3 + A_4 y^4 + A_5 y^5 + A_6 y^6 + A_7 y^7 + A_8 y^8 + A_9 y^9 + A_{10} y^{10} + A_{11} y^{11} + A_{12} y^{12} + A_{13} y^{13} + A_{14} y^{14} + A_{15} y^{15} + A_{16} y^{16} \quad \text{(formula 1)}$$

In the formula, Z is a sag in the direction of the optical axis A, and c is the inverse of the radius of an osculating sphere, i.e. the inverse of the curvature radii (e.g., the curvature radii of the surfaces S1 and S2 in Table 1) close to the optical axis A. K is a conic coefficient, y is an aspheric height, and $A_1$ to $A_{16}$ are aspheric coefficients. The parameter values of the surfaces S1, S2, S5, S6, and S16 are listed in Table 2.

TABLE 2

| Aspheric Parameter | S1 | S2 | S5 | S6 | S16 |
|---|---|---|---|---|---|
| K | 7.45E+00 | −7.89E−01 | 0.00E+00 | 8.62E+00 | −7.13E+00 |
| $A_1$ | 3.09E−02 | 2.76E−02 | −1.97E−04 | 4.21E−05 | 0.00E+00 |
| $A_2$ | −6.91E−04 | −2.53E−03 | 1.36E−02 | 2.32E−02 | 0.00E+00 |
| $A_3$ | −2.81E−04 | −2.93E−04 | −1.59E−04 | −2.13E−04 | 0.00E+00 |
| $A_4$ | 1.12E−05 | −1.49E−05 | −7.87E−05 | 1.44E−05 | −4.50E−04 |
| $A_5$ | 1.17E−07 | −3.66E−07 | 3.63E−06 | −5.04E−06 | 0.00E+00 |
| $A_6$ | −5.74E−09 | 4.51E−08 | 5.43E−07 | 9.53E−07 | 6.16E−06 |
| $A_7$ | −5.84E−11 | 3.43E−10 | −1.93E−08 | −9.72E−09 | 0.00E+00 |
| $A_8$ | 1.77E−12 | −2.87E−11 | −4.02E−09 | −3.17E−09 | −5.24E−08 |

TABLE 2-continued

| Aspheric Parameter | S1 | S2 | S5 | S6 | S16 |
|---|---|---|---|---|---|
| $A_9$ | −9.00E−15 | 5.69E−13 | 9.75E−11 | −2.15E−12 | 0.00E+00 |
| $A_{10}$ | 9.52E−16 | −4.97E−14 | 1.24E−11 | −7.06E−12 | −1.67E−09 |
| $A_{11}$ | 1.63E−17 | 1.09E−16 | −4.18E−14 | 2.85E−15 | 0.00E+00 |
| $A_{12}$ | −8.61E−19 | −3.43E−17 | −2.26E−14 | 8.18E−14 | 6.38E−11 |
| $A_{13}$ | −6.37E−21 | −9.23E−19 | −2.16E−15 | 4.14E−15 | 0.00E+00 |
| $A_{14}$ | 2.44E−22 | 6.86E−20 | 1.39E−16 | −3.93E−16 | −8.76E−13 |
| $A_{15}$ | 0.00E+00 | 0.00E+00 | 0.00E+00 | 0.00E+00 | 0.00E+00 |
| $A_{16}$ | 0.00E+00 | 0.00E+00 | 0.00E+00 | 0.00E+00 | 4.40E−15 |

Figure 2:
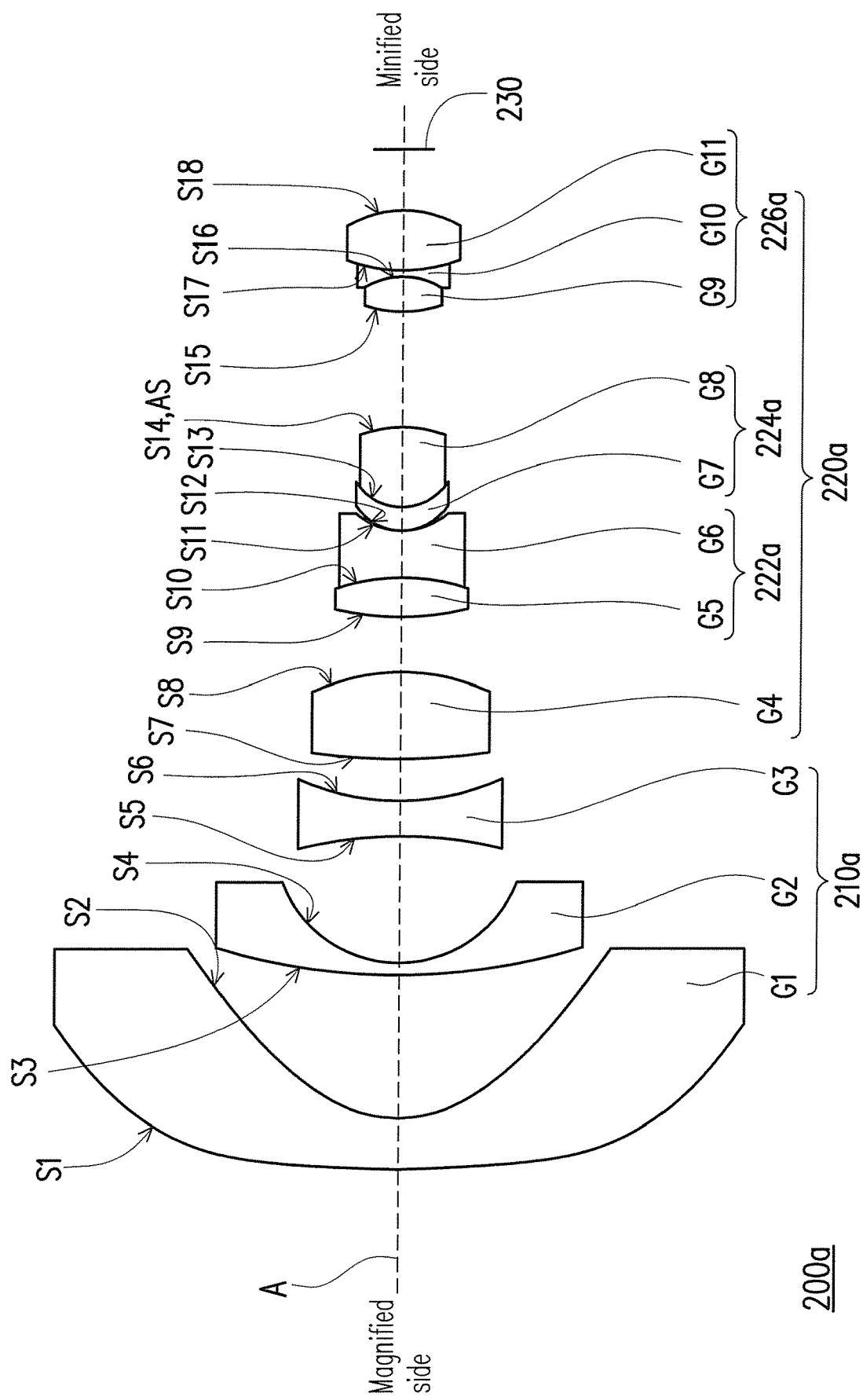
FIG. 2 is a schematic view of an optical lens according to another embodiment of the invention.

FIG. 2 is a schematic view of an optical lens according to another embodiment of the invention. In the optical lens 200a according to this embodiment, the third lens G3 of the first group 210a is a biconcave lens, e.g. a biconcave plastic lens. In this embodiment, the fifth lens G5 and the sixth lens G6 form a double cemented lens 222a, e.g. a double cemented glass lens. The seventh lens G7 and the eighth lens G8 form a double cemented lens 224a, e.g. a double cemented glass lens. The ninth lens G9, the tenth lens G10, and the eleventh lens G11 form a triple cemented lens 226a, e.g. a triple cemented glass lens. In this embodiment, the eleventh lens G11 is an aspheric lens. The refractive powers of the first and second lens groups are negative and positive, respectively.

In this embodiment, the fourth lens G4 is a biconvex lens, the fifth lens G5 is a biconvex lens, the sixth lens G6 is a biconcave lens, the seventh lens G7 is a convex-concave lens having a convex surface facing the magnified side, the eighth lens G8 is a biconvex lens, the ninth lens G9 is a biconvex lens, the tenth lens G10 is a biconcave lens, and the eleventh lens G11 is a biconvex lens. In this embodiment, an aperture stop AS is located at a surface S14 of the eighth lens G8 facing the minified side.

An embodiment of the optical lens 200 is given hereinafter. However, the invention is not limited to the data listed in Tables 3 and 4.

TABLE 3

(F/H: 0.56)

| Surface | Curvature Radius(mm) | Interval (mm) | Refractive index | Abbe Number | Notes (refractive power) |
|---|---|---|---|---|---|
| S1 | 191.20 | 5.18 | 1.49 | 57.44 | First lens(−) |
| S2 | 14.69 | 14.48 | | | |
| S3 | 70.29 | 2.41 | 1.86 | 37.78 | Second lens(−) |
| S4 | 16.64 | 12.68 | | | |
| S5 | −26.92 | 3.95 | 1.53 | 56.28 | Third lens(−) |
| S6 | 406.46 | 11.91 | | | |
| S7 | 77.69 | 10.50 | 1.68 | 32.42 | Fourth lens(+) |
| S8 | −41.52 | 1.03 | | | |
| S9 | 30.01 | 7.00 | 1.69 | 33.68 | Fifth lens(+) |
| S10 | −22.03 | 4.16 | 1.88 | 40.77 | Sixth lens(−) |
| S11 | 15.03 | 0.15 | | | |
| S12 | 11.33 | 2.96 | 1.90 | 36.48 | Seventh lens(−) |
| S13 | 7.52 | 9.52 | 1.61 | 39.61 | Eighth lens(+) |
| S14 | −30.85 | 1.43 | | | |
| S15 | 25.88 | 3.59 | 1.65 | 59.61 | Ninth lens(+) |
| S16 | −15.19 | 0.85 | 1.87 | 29.11 | Tenth lens(−) |
| S17 | 14.65 | 4.96 | 1.55 | 71.34 | Eleventh lens(+) |
| S18 | −16.53 | 21.50 | | | |

The surfaces S1, S2, S5, S6, and S18 of the optical lens 200a are aspheric surfaces and may be represented by the formula (1).

The parameter values of the surfaces S1, S2, S5, S6, and S18 are listed in Table 4.

TABLE 4

| Aspheric Parameter | S1 | S2 | S5 | S6 | S18 |
|---|---|---|---|---|---|
| K | 2.13E+01 | −7.52E−01 | 0.00E+00 | −1.64E+00 | −1.32E+01 |
| $A_1$ | −1.29E−02 | −1.61E−02 | −6.18E−04 | −5.02E−04 | 0.00E+00 |
| $A_2$ | −5.42E−03 | −7.19E−03 | 2.57E−02 | 2.34E−02 | 0.00E+00 |
| $A_3$ | 1.84E−04 | −1.75E−04 | −2.65E−04 | −3.05E−04 | 0.00E+00 |
| $A_4$ | 4.72E−06 | −5.34E−08 | −1.07E−04 | −4.40E−05 | −3.45E−04 |
| $A_5$ | 4.84E−08 | −5.17E−07 | 3.36E−06 | −1.06E−06 | 0.00E+00 |
| $A_6$ | −6.29E−09 | 3.52E−08 | 6.65E−07 | 1.02E−06 | 5.37E−06 |
| $A_7$ | −1.93E−11 | 1.28E−10 | −1.23E−08 | −1.77E−08 | 0.00E+00 |
| $A_8$ | 3.13E−12 | −3.01E−11 | −4.13E−09 | −3.75E−09 | −4.61E−08 |
| $A_9$ | 2.15E−15 | 4.71E−13 | 5.45E−11 | −7.66E−12 | 0.00E+00 |
| $A_{10}$ | 5.66E−16 | −5.20E−14 | 9.57E−12 | −5.17E−12 | −1.66E−09 |
| $A_{11}$ | 6.08E−19 | 4.03E−17 | −3.12E−14 | 2.64E−13 | 0.00E+00 |
| $A_{12}$ | −1.13E−18 | −3.58E−17 | −4.86E−15 | 8.79E−14 | 6.37E−11 |
| $A_{13}$ | −1.91E−21 | −6.60E−19 | −9.81E−16 | 3.16E−15 | 0.00E+00 |
| $A_{14}$ | 4.03E−22 | 7.37E−20 | 4.86E−17 | −4.16E−16 | −8.77E−13 |
| $A_{15}$ | 0.00E+00 | 0.00E+00 | 0.00E+00 | 0.00E+00 | 0.00E+00 |
| $A_{16}$ | 0.00E+00 | 0.00E+00 | 0.00E+00 | 0.00E+00 | 4.42E−15 |

Figure 3:
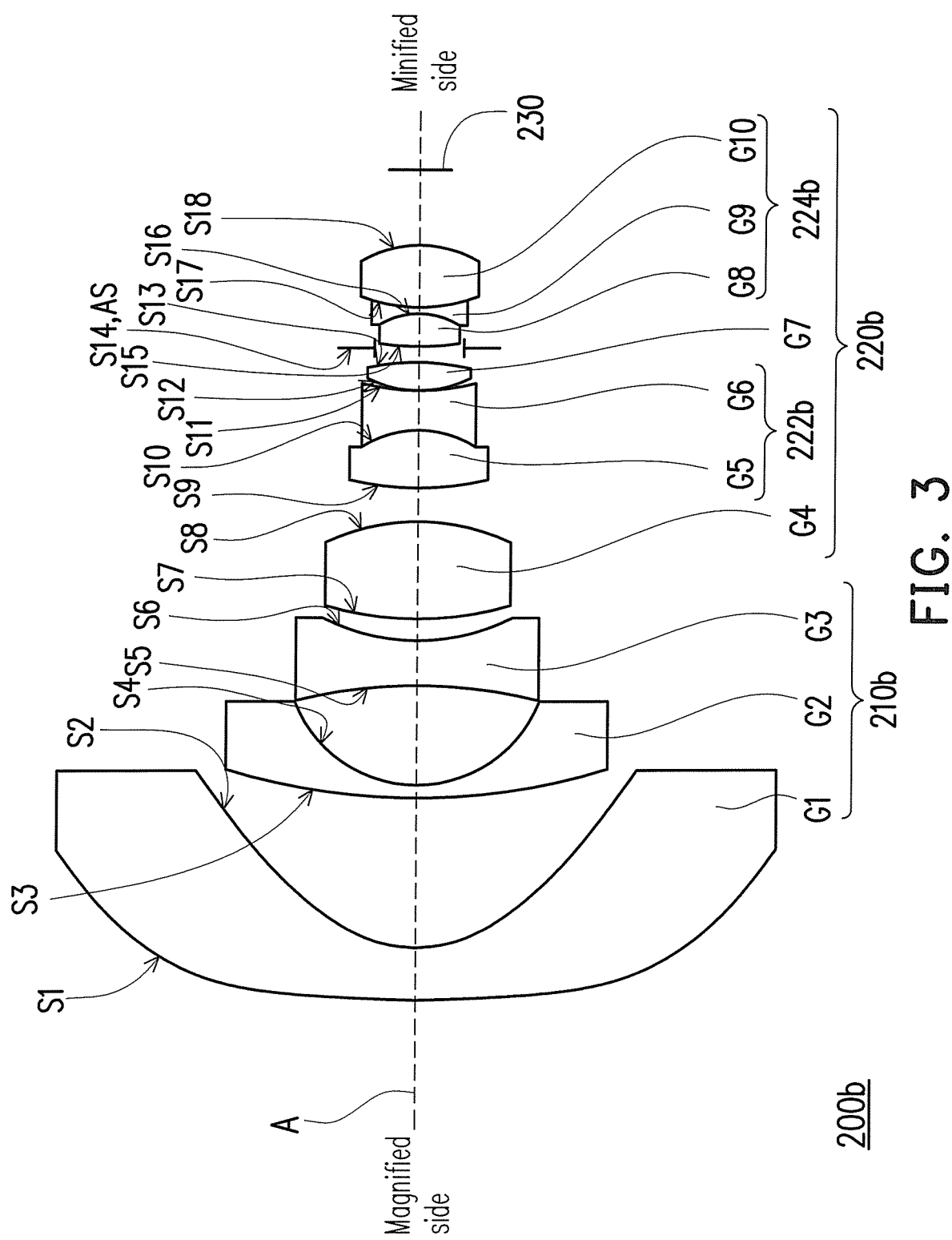
FIG. 3 is a schematic view of an optical lens according to another embodiment of the invention.

FIG. 3 is a schematic view of an optical lens according to another embodiment of the invention. In the optical lens 200b according to this embodiment, the third lens G3 of the first group 210b is a biconcave lens. In addition, in this embodiment, the second lens G2 of the first group 210b is an aspheric lens, e.g. an aspheric plastic lens, while the third lens G3 of the first group 210b is a spherical lens, e.g. a spherical glass lens. Moreover, in this embodiment, the fifth lens G5 and the sixth lens G6 form a double cemented lens 222b, e.g. a double cemented glass lens, the eighth, ninth, and tenth lenses G8, G9, and G10 form a triple cemented lens 224b, e.g. a triple cemented glass lens, and the seventh lens G7 is an aspheric lens, e.g. an aspheric glass lens. Moreover, in this embodiment, an aperture stop AS is located at a surface S15 of the eighth lens G8 facing the magnified side. The refractive powers of the first and second lens groups are negative and positive, respectively.

An embodiment of the optical lens 200b is given hereinafter. However, the invention is not limited to the data listed in Tables 5 and 6.

TABLE 5

(F/H: 0.519)

| Surface | Curvature Radius(mm) | Interval (mm) | Refractive index | Abbe Number | Notes (refractive power) |
|---|---|---|---|---|---|
| S1 | 33.32 | 4.56 | 1.49 | 57.44 | First lens(−) |
| S2 | 13.90 | 20.48 | | | |
| S3 | 48.15 | 2.76 | 1.53 | 56.28 | Second lens(−) |
| S4 | 13.63 | 10.33 | | | |
| S5 | −39.72 | 2.91 | 1.83 | 37.16 | Third lens(−) |
| S6 | 17.75 | 2.26 | | | |
| S7 | 28.29 | 14.20 | 1.81 | 25.43 | Fourth lens(+) |
| S8 | −33.47 | 1.25 | | | |
| S9 | 50.21 | 9.00 | 1.61 | 37.01 | Fifth lens(+) |
| S10 | −13.32 | 9.00 | 1.83 | 37.16 | Sixth lens(−) |
| S11 | 32.67 | 0.38 | | | |
| S12 | 12.79 | 4.59 | 1.58 | 59.10 | Seventh lens(+) |
| S13 | −14.82 | 0.15 | | | |
| S14 | Infinity | 0.00 | | | Aperture stop |
| S15 | 274.39 | 3.69 | 1.62 | 36.26 | Eighth lens (+) |
| S16 | −8.31 | 2.20 | 1.83 | 37.16 | Ninth lens(−) |
| S17 | 12.23 | 5.00 | 1.50 | 81.55 | Tenth lens(+) |
| S18 | −11.52 | 21.30 | | | |

The surfaces S1, S2, S3, S4, S12, and S13 of the optical lens 200b are aspheric surfaces and may be represented by the formula (1), wherein in this embodiment, $A_{15}$ and $A_{15}$ is set to be 0.

The parameter values of the surfaces S1, S2, S3, S4, S12, and S13 are listed in Table 6.

Figure 4:
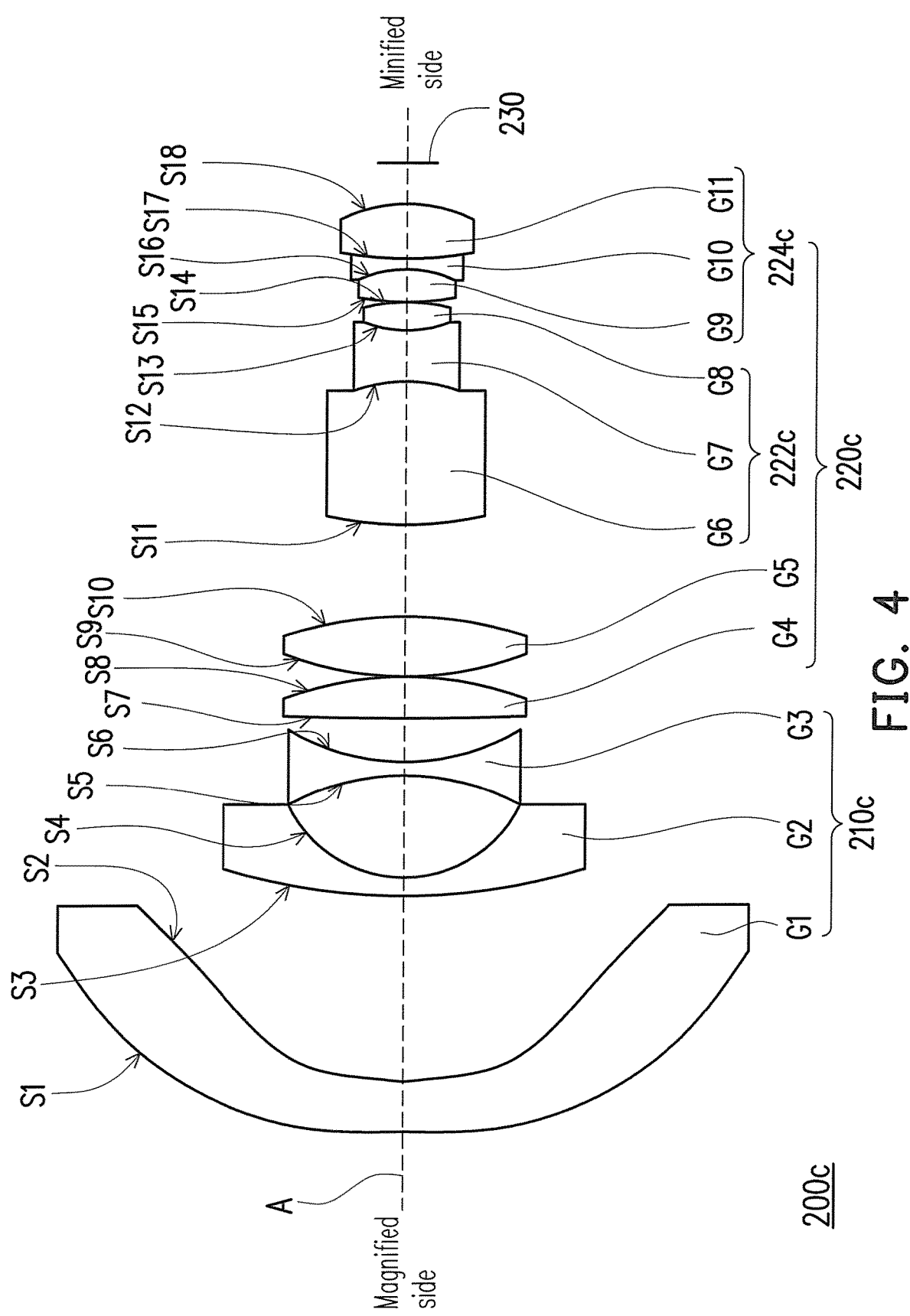
FIG. 4 is a schematic view of an optical lens according to another embodiment of the invention.

FIG. 4 is a schematic view of an optical lens according to another embodiment of the invention. Referring to FIG. 4, the optical lens 200c in this embodiment includes a first lens group 210c and a second lens group 220c. The refractive powers of the first and second lens groups are negative and positive respectively. In this embodiment, the first lens group 210c includes a first lens G1, a second lens G2, and a third lens G3 arranged in sequence from the magnified side towards the minified side. The first lens G1 is an aspheric lens, e.g. an aspheric plastic lens, and the other lenses (e.g. the second lens G2 and the third lens G3) in the first lens group 210c are spherical lenses, e.g. spherical glass lenses. In this embodiment, all the lenses in the second lens group 220c are spherical lenses, e.g. spherical glass lenses. The second lens group 220c includes at least one triple cemented lens and at least two independent lenses. The independent lens means a non-cemented lens. The optical lens 200c satisfies 0.3<F/FM<0.4, where F is the effective focal lens of the optical lens 200c, and FM is the effective focal lens of the two independent lenses.

In this embodiment, the first lens G1 is a convex-concave lens having a convex surface facing the magnified side, the second lens G2 is a convex-concave lens having a convex surface facing the magnified side, and the third lens G3 is a biconcave lens. In this embodiment, the fourth lens G4 and the fifth lens G5 are the aforementioned two independent lenses, and the aforementioned FM is the effective focal length of the fourth lens G4 and the fifth lens G5.

In this embodiment, the sixth lens G6, the seventh lens G7, and the eighth lens G8 form a positive triple cemented lens 222c, and the ninth lens G9, the tenth lens G10, and the eleventh lens G11 form a positive triple cemented lens 224c.

In this embodiment, the fourth lens G4 is a plane-convex lens having a convex surface facing the minified side, the fifth lens G5 is a biconvex lens, the sixth lens G6 is a biconvex lens, the seventh lens G7 is a biconcave lens, the eighth lens G8 is a biconvex lens, the ninth lens G9 is a biconvex lens, the tenth lens G10 is a biconcave lens, and the eleventh lens G11 is a biconvex lens.

The optical lens 200c in this embodiment may achieve low aberration, and an f-number of the optical lens 200c may achieve 2.5. Moreover, the optical lens 200c in this embodiment may adopt only one aspheric lens to achieve low aberration and a low f-number, which may reduce the cost of the molding of the aspheric lens and improve the stability of mass production.

TABLE 6

| Aspheric Parameter | S1 | S2 | S3 | S4 | S12 | S13 |
|---|---|---|---|---|---|---|
| K | −3.78E−01 | −7.70E−01 | 0.00E+00 | 0.00E+00 | 0.00E+00 | −1.69E+00 |
| $A_1$ | −1.28E−01 | −1.52E−01 | 0.00E+00 | 0.00E+00 | 0.00E+00 | 0.00E+00 |
| $A_2$ | −1.04E−02 | 1.26E−02 | 0.00E+00 | 0.00E+00 | 0.00E+00 | 0.00E+00 |
| $A_3$ | 1.00E−03 | −2.32E−03 | 0.00E+00 | 0.00E+00 | 0.00E+00 | 0.00E+00 |
| $A_4$ | −3.74E−05 | 2.66E−04 | −4.65E−05 | −8.18E−05 | −4.86E−05 | 4.84E−05 |
| $A_5$ | 5.57E−07 | −7.39E−06 | 0.00E+00 | 0.00E+00 | 0.00E+00 | 0.00E+00 |
| $A_6$ | −1.96E−08 | −6.18E−08 | 1.04E−07 | 2.25E−08 | 5.92E−07 | −5.63E−08 |
| $A_7$ | 1.09E−11 | −1.70E−10 | 0.00E+00 | 0.00E+00 | 0.00E+00 | 0.00E+00 |
| $A_8$ | 2.80E−11 | −5.36E−11 | −3.62E−11 | 5.91E−09 | −9.57E−09 | −1.11E−10 |
| $A_9$ | −3.77E−14 | 6.61E−13 | 0.00E+00 | 0.00E+00 | 0.00E+00 | 0.00E+00 |
| $A_{10}$ | −1.64E−14 | 5.15E−15 | −1.45E−13 | −5.88E−11 | 2.24E−10 | 9.41E−11 |
| $A_{11}$ | −5.61E−16 | 5.46E−15 | 0.00E+00 | 0.00E+00 | 0.00E+00 | 0.00E+00 |
| $A_{12}$ | 3.20E−17 | 1.77E−16 | 1.42E−16 | 1.98E−13 | 0.00E+00 | 5.71E−14 |
| $A_{13}$ | −4.19E−19 | −1.16E−18 | 0.00E+00 | 0.00E+00 | 0.00E+00 | 0.00E+00 |
| $A_{14}$ | 1.28E−21 | −2.62E−19 | 0.00E+00 | 0.00E+00 | 0.00E+00 | 0.00E+00 |

An embodiment of the optical lens 200c is given hereinafter. However, the invention is not limited to the data listed in Tables 7 and 8.

TABLE 7

| Surface | Curvature Radius(mm) | Interval (mm) | Refractive index | Abbe Number | Notes (refractive power) |
|---|---|---|---|---|---|
| S1 | 58.67 | 4.07 | 1.49 | 57.84 | First lens(−) |
| S2 | 34.76 | 19.63 | | | |
| S3 | 64.72 | 1.87 | 1.69 | 55.32 | Second lens(−) |
| S4 | 13.48 | 11.28 | | | |
| S5 | −26.18 | 1.28 | 1.84 | 23.77 | Third lens(−) |
| S6 | 32.67 | 4.23 | | | |
| S7 | Infinity | 4.26 | 1.8 | 25.42 | Fourth lens(+) |
| S8 | −33.43 | 0.11 | | | |
| S9 | 41.32 | 5.93 | 1.64 | 33.79 | Fifth lens(+) |
| S10 | −48.93 | 9.51 | | | |
| S11 | 40.59 | 14.99 | 1.68 | 31.07 | Sixth lens(+) |
| S12 | −15.75 | 5.30 | 1.8 | 34.96 | Seventh lens(−) |
| S13 | 12.81 | 2.94 | 1.51 | 52.43 | Eighth lens(+) |
| S14 | −20.232 | 0.20 | | | |
| S15 | 49.49 | 3.64 | 1.61 | 63.33 | Ninth lens(+) |
| S16 | −8.16 | 0.71 | 1.8 | 34.96 | Tenth lens(−) |
| S17 | 68.86 | 5.61 | 1.58 | 61.13 | Eleventh lens(+) |
| S18 | −13.31 | 19.20 | | | |

The surfaces S1 and S2 of the optical lens 200c are aspheric surfaces and may be represented by the formula (1).

The parameter values of the surfaces S1 and S2 are listed in Table 8.

TABLE 8

| Aspheric Parameter | S1 | S2 |
|---|---|---|
| K | 1.24 | −3.47 |
| $A_1$ | 0.00E+00 | 0.00E+00 |
| $A_2$ | −1.35E−02 | −2.82E−03 |
| $A_3$ | 4.89E−04 | 4.20E−04 |
| $A_4$ | 3.13E−06 | 1.75E−05 |
| $A_5$ | 2.61E−07 | 8.24E−08 |
| $A_6$ | −3.29E−08 | −1.02E−08 |
| $A_7$ | 3.65E−11 | −1.50E−10 |
| $A_8$ | 3.03E−11 | −3.11E−12 |
| $A_9$ | 6.12E−14 | −6.27E−13 |
| $A_{10}$ | −2.08E−14 | −1.59E−14 |
| $A_{11}$ | −2.00E−17 | −1.45E−16 |
| $A_{12}$ | 5.87E−18 | 8.14E−17 |
| $A_{13}$ | 5.37E−20 | −1.14E−18 |
| $A_{14}$ | −2.58E−21 | −6.36E−21 |
| $A_{15}$ | 6.97E−23 | 9.11E−24 |
| $A_{16}$ | −1.08E−24 | −8.88E−25 |

Figure 5:
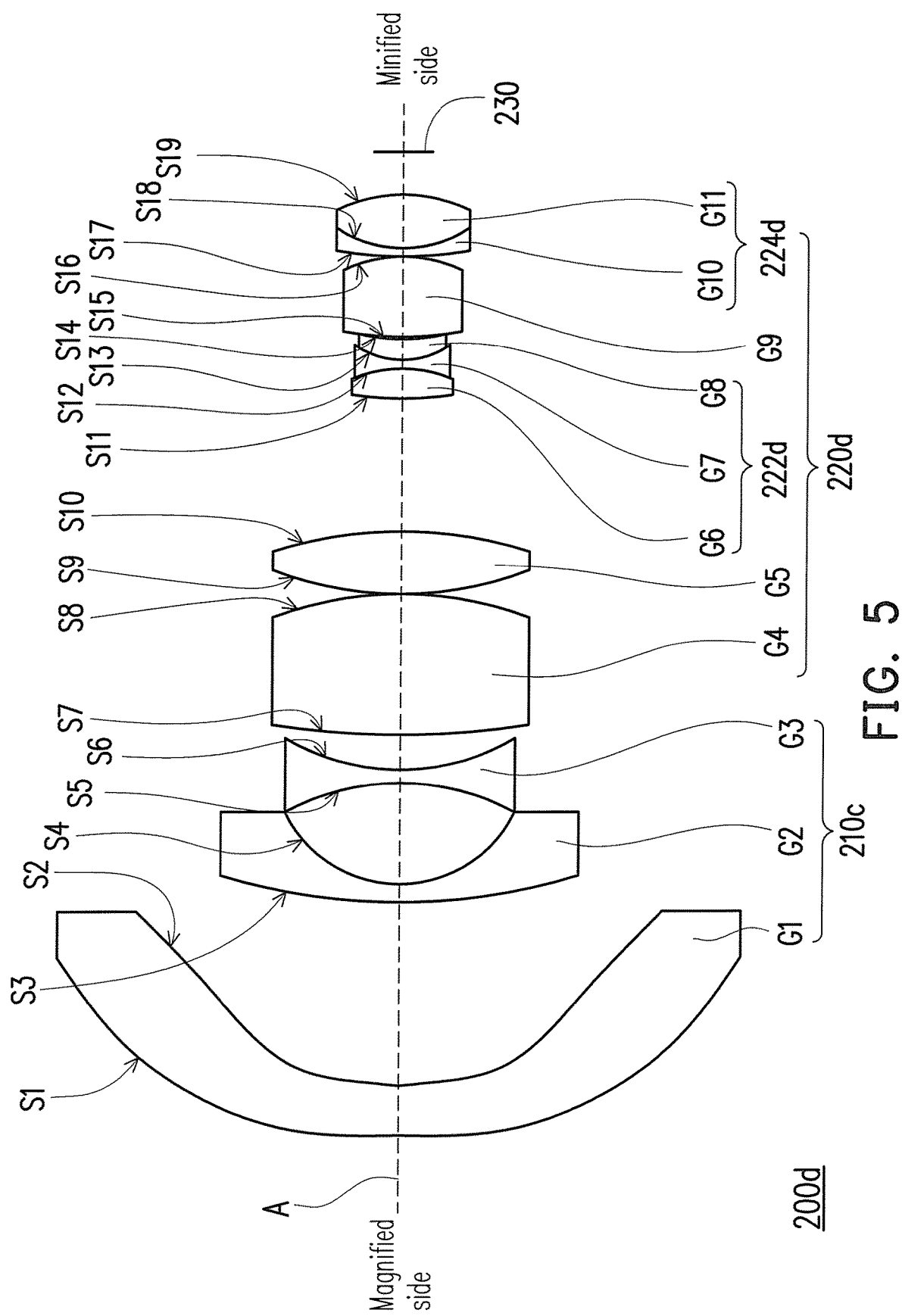
FIG. 5 is a schematic view of an optical lens according to another embodiment of the invention.

FIG. 5 is a schematic view of an optical lens according to another embodiment of the invention. In this embodiment, the tenth lens G10 and the eleventh lens G11 in the second lens group 220d form a double cemented lens 224d, e.g. a double cemented glass lens, while the sixth lens G6, the seventh lens G7, and the eighth lens G8 in the second lens group 220d form a triple cemented lens 222d, e.g. a triple cemented glass lens. Moreover, in this embodiment, the fourth lens G4 is a biconvex lens, e.g. a biconvex glass lens, the eighth lens G8 is a concave-convex lens having a convex surface facing the magnified side, and the tenth lens G10 is a convex-concave lens having a convex surface facing the magnified side. Moreover, the aforementioned FM is the effective focal length of the fourth lens G4 and the fifth lens G5, wherein the fifth lens G5 may be a glass lens.

An embodiment of the optical lens 200d is given hereinafter. However, the invention is not limited to the data listed in Tables 9 and 10.

TABLE 9

| Surface | Curvature Radius(mm) | Interval (mm) | Refractive index | Abbe Number | Notes (refractive power) |
|---|---|---|---|---|---|
| S1 | 56.52 | 4.69 | 1.49 | 57.84 | First lens(−) |
| S2 | 21.21 | 17.24 | | | |
| S3 | 46.01 | 1.91 | 1.71 | 53.86 | Second lens(−) |
| S4 | 14.21 | 11.16 | | | |
| S5 | −34.44 | 1.3 | 1.8 | 25.42 | Third lens(−) |
| S6 | 25.23 | 4.83 | | | |
| S7 | 141.86 | 13.62 | 1.84 | 23.77 | Fourth lens(+) |
| S8 | −50.20 | 0.22 | | | |
| S9 | 32.46 | 6.43 | 1.64 | 33.79 | Fifth lens(+) |
| S10 | −73.81 | 13.87 | | | |
| S11 | 21.49 | 3.26 | 1.51 | 52.43 | Sixth lens(+) |
| S12 | −15.35 | 0.77 | 1.8 | 34.96 | Seventh lens(−) |
| S13 | 8.85 | 2.26 | 1.64 | 33.79 | Eighth lens(+) |
| S14 | 22.43 | 0.1 | | | |
| S15 | 15.83 | 8.43 | 1.48 | 70.23 | Ninth lens(+) |
| S16 | −18.86 | 0.14 | | | |
| S17 | 26.86 | 0.78 | 1.83 | 37.16 | Tenth lens(−) |
| S18 | 11.74 | 4.63 | 1.48 | 70.23 | Eleventh lens(+) |
| S19 | −32.68 | 19.14 | | | |

The surfaces S1 and S2 of the optical lens 200d are aspheric surfaces and may be represented by the formula (1).

The parameter values of the surfaces S1 and S2 are listed in Table 10.

TABLE 10

| Aspheric Parameter | S1 | S2 |
|---|---|---|
| K | 1.05 | −0.69 |
| $A_1$ | −1.62E−03 | 0.00E+00 |
| $A_2$ | −6.27E−03 | −3.81E−03 |
| $A_3$ | −2.77E−05 | −1.63E−04 |
| $A_4$ | 1.28E−05 | 2.26E−05 |
| $A_5$ | 3.68E−07 | 2.80E−07 |
| $A_6$ | −3.26E−08 | −1.37E−08 |
| $A_7$ | −5.85E−11 | −3.64E−10 |
| $A_8$ | 2.70E−11 | −1.32E−11 |
| $A_9$ | 9.53E−15 | −6.01E−13 |
| $A_{10}$ | −1.70E−14 | −1.62E−14 |
| $A_{11}$ | 1.55E−17 | 1.15E−16 |
| $A_{12}$ | 6.63E−18 | 8.60E−17 |
| $A_{13}$ | −2.25E−22 | −1.26E−18 |
| $A_{14}$ | −1.43E−21 | −6.73E−21 |
| $A_{15}$ | −2.05E−25 | −3.00E−25 |
| $A_{16}$ | −9.69E−27 | 1.54E−25 |

To sum up, at least one of the following advantages or effects may be achieved according to the embodiments of the invention. Accordingly, compared to the conventional lens, the optical lens provided herein has the reduced number of lenses and thus has the simplified design. Moreover, the first lens described in the embodiments of the invention is the aspheric plastic lens, which may effectively resolve the distortion issues of the fixed focal length lens. By contrast, all the lenses other than the first lens may be spherical lenses in some embodiments, and thereby the manufacturing costs may be effectively lowered down. In the above embodiments, the material of the lens can be glass, plastic or similar substances.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particular exemplary embodiments of the invention does not imply a limitation on the invention, and no such limitation is to be inferred. The invention is limited only by the spirit and scope of the appended claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection lens comprising:
   a first lens set, an aperture stop and a second lens set arranged in sequence from a first side to a second side;
   the first lens set having positive refractive power, a lens closest to the first side in the first lens set being an aspheric lens, the first lens set comprising a triple cemented lens with a positively powered lens and a negatively powered lens therein; and
   the second lens set having a positive refractive power and comprising at least three lenses,
   wherein the projection lens satisfies a condition of 0.52>F/H>0.46, F is an effective focal length of the projection lens, H is an image height, and the image height is a distance between an optical axis of the projection lens and a lower-left end point of a light valve;
   wherein the projection lens is a fixed focus lens, and the projection lens comprises a plurality of aspheric lenses.

2. The projection lens according to claim 1, wherein the first lens set comprises two aspheric lenses and at least one lens having a refractive index greater than 1.75, the projection lens comprises no more than eleven lenses.

3. The projection lens according to claim 1, wherein an f-number of the projection lens ranges from 2.35 to 3.0.

4. The projection lens according to claim 1, wherein the second lens set comprises a cemented lens formed of three lenses with refractive power.

5. The projection lens according to claim 1, wherein the second lens set comprises at least one cemented lens.

6. The projection lens according to claim 1, wherein the first lens set comprises a first lens, a second lens, and a third lens arranged in sequence from the first side towards the second side, and one of the second lens and the third lens is an aspheric lens.

7. The projection lens according to claim 6, wherein refractive powers of the first to third lenses are all negative powered.

8. The projection lens according to claim 1, wherein the first lens set comprises a fourth lens, a fifth lens, a sixth lens, and a seventh lens arranged in sequence from the first side towards the second side, the second lens set comprises an eighth lens, a ninth lens, and a tenth lens arranged in sequence from the first side towards the second side, and refractive powers of the fourth to tenth lens are positive, positive, negative, positive, positive, negative, and positive, respectively.

9. The projection lens according to claim 8, wherein the fifth, sixth, and seventh lenses form the triple cemented lens of the first lens set, wherein the eighth, ninth, and tenth lenses form a triple cemented lens.

10. The projection lens according to claim 1, wherein the aperture stop is located at a surface of a lens facing the second side, wherein the first side is a magnified side and the second side is a minified side.

11. The projection lens according to claim 1, wherein the first lens set comprises a fourth lens, a fifth lens, a sixth lens, a seventh lens, and an eighth lens arranged in sequence from the first side towards the second side, the second lens set comprises a ninth lens, a tenth lens, and an eleventh lens arranged in sequence from the first side towards the second side, and refractive powers of the fourth, fifth, and seventh to eleventh lens are positive, positive, negative, positive, positive, negative, and positive, respectively.

12. The projection lens according to claim 11, wherein the ninth lens, the tenth lens, and the eleventh lens form a triple cemented lens, and wherein the eleventh lens is an aspheric lens.

13. The projection lens according to claim 11, wherein the aperture stop is located at a surface of the eighth lens facing the second side.

14. The projection lens according to claim 1, wherein the first lens set has 7 lenses with refractive power.

15. A projection lens comprising:
    a first lens set disposed between a magnified side and a minified side, the first lens set having a positive refractive power, the first lens set comprising two aspheric lenses and at least one lens having a refractive index greater than 1.75, a lens closest to the magnified side in the first lens set having two aspheric surfaces, the first lens set comprising three lenses with refractive power, the three lenses with refractive power being connected by two pairs of lens connecting surfaces, radii of curvature of lens connecting surfaces in the same pair being substantially the same respectively;
    an aperture stop, disposed at the minified side of the first lens set;
    a second lens set disposed between the first lens set and the minified side, the second lens set having a positive refractive power,
    wherein the projection lens is capable of forming an image at the magnified side, and wherein an f-number of the optical lens ranges from 2.35 to 3.0;
    wherein the projection lens is a fixed focus lens, and the projection lens comprises no more than 11 lenses with refractive power.

16. The projection lens according to claim 15, wherein the projection lens satisfies a condition of F/H>0.46, F is an effective focal length of the optical lens, H is an image height, and the image height is a distance between an optical axis of the projection lens and a lower-left end point of a light valve.

17. The projection lens according to claim 15, wherein the first lens set comprises a first lens, a second lens, and a third lens arranged in sequence from the magnified side towards the minified side, one of the second lens and the third lens is an aspheric lens, and the projection lens comprises no more than eleven lenses, wherein the three lenses with refractive power being connected by two pairs of lens connecting surfaces form a triple cemented lens.

18. The projection lens according to claim 17, wherein the first lens set further comprises a fourth lens, a fifth lens, a sixth lens, and a seventh lens arranged in sequence from the magnified side towards the minified side, the second lens set comprises an eighth lens, a ninth lens, and a tenth lens arranged in sequence from the magnified side towards the minified side, and refractive powers of the fourth to tenth lens are positive, positive, negative, positive, positive, negative, and positive, respectively.

* * * * *